Figure 1:
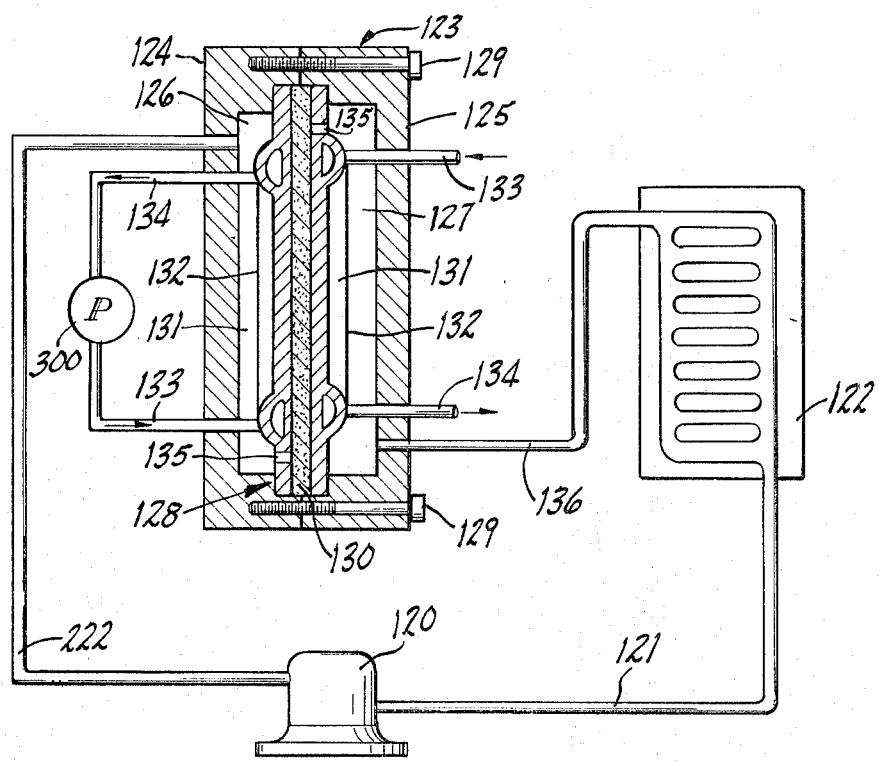

Dec. 6, 1966  E. I. VALYI  3,289,750
HEAT EXCHANGER
Filed June 14, 1962

INVENTOR:
EMERY I. VALYI
BY
ATTORNEY

United States Patent Office 3,289,750
Patented Dec. 6, 1966

3,289,750
HEAT EXCHANGER
Emery I. Valyi, Riverdale, N.Y., assignor to Olin Mathieson Chemical Corporation, a corporation of Virginia
Original application June 14, 1962, Ser. No. 202,612, now Patent No. 3,201,858, dated Aug. 24, 1965. Divided and this application Sept. 21, 1964, Ser. No. 398,128
8 Claims. (Cl. 165—110)

This application is a division of co-pending application Ser. No. 202,612, filed June 14, 1962, now U.S. Patent 3,201,858, which in turn is a continuation-in-part of U.S. patent application Ser. No. 732,663, filed May 2, 1958, now U.S. Patent 3,049,795. Said application Ser. No. 732,663 is a continuation-in-part of U.S. patent application Ser. No. 586,259, filed May 21, 1956, now abandoned.

This invention relates to porous fabrications, and more particularly to a permeable body integrated to a supporting sheet metal structure adapted to conduct a fluid to the said permeable body for flow and distribution therethrough.

As brought out in the aforesaid co-pending applications, the subject matter thereof was directed to novel features wherein a permeable body formed of powdered metal is joined to a supporting metal structure so as to become integral therewith in all areas except where they are formed between the permeable and impervious portions of the structure.

The resultant porous fabrication may be utilized advantageously in various applications. For example, it may be employed in the subsequent manufacture of gas burners that are intended to provide evenly distributed heat over large surfaces. In such application a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transpiration cooling. In a further application, the porous fabrication may be utilized in the construction of filters wherein the porous metal body provides a controlled porosity and permeability so as to enable a liquid carrier to filter through the porous metal body while leaving filtrate on the other side thereof. As will be recognized, one of the most important limitations restricting the use of porous fabrications resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies is less than that of solid metal bodies and that it is difficult and costly to effect efficient heat transfer to the porous bodies and through them. While the techniques and methods of producing pervious or porous bodies from powder metal have been extensively discussed in the literature such as for example in "Powder Metallurgy" by Dr. Paul Schwarzkopf (the MacMillan Company, New York, 1947) and "Powder Metallurgy" edited by John Wulff (the American Society of Metals, Cleveland, 1942) no economical and efficient method has been found thus far to overcome the limitations above referred to prior to the invention described in the aforesaid co-pending applications; the basic concept of the contribution therein comprises the forming of an integral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions between the confronting faces of various layers comprising the integrated porous structure.

In accordance with the disclosure of the aforesaid co-pending applications, the porous fabrication is formed from a supporting sheet metal member which may have all or a portion thereof in the form of a flat, relatively thin plate, sheet, or strip. A pattern or weld-inhibiting material is applied to this member in a design corresponding to that desired for the fluid conducting channels which are to be provided in the ultimate structure. Following the application of the weld-inhibiting material, a substantial layer of powdered metal aggregate is deposited upon the plate thus treated. Subsequent thereto this composite structure may be subjected to pressure to compact the powdered metal and to press it firmly against the solid plate. This compacted assembly is then exposed to a suitable sintering temperature under conditions preventing undesired reactions, such as oxidation of the metal. This sintering operation accomplishes the sintering of the powdered metal particles to each other together with the metallurgical bonding, welding, of the sintered metal aggregate to the solid member.

In an alternate method disclosed in the foregoing co-pending application, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in those portions separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channels defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood the ultimate use of the resultant integrated structure determines the specific combination of alloys to be employed.

Accordingly, among the objects of this invention is to provide a novel fluid permeable porous metal structure adapted to distribute a fluid and heat in flow therethrough.

Figure 2:
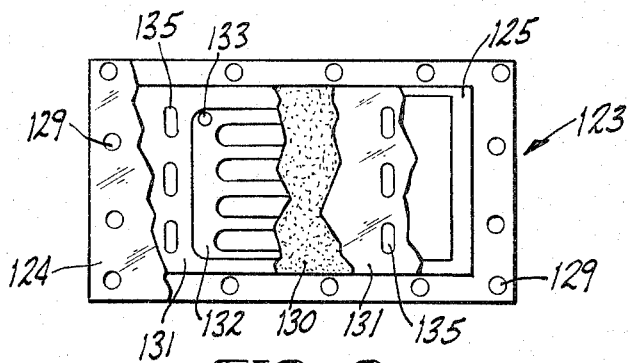
Figure 3:
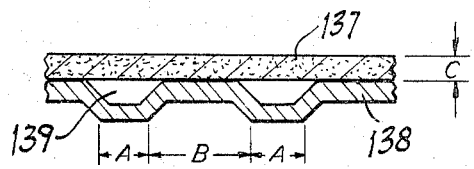

Other objects and advantages of this invention will become more apparent from the following drawings and description in which FIGURE 1 is a side elevational view, partly in section;

FIGURE 2 is a plan view of the heat exchange assembly of FIGURE 1, partly in section, with portions cut away; and FIGURE 3 is a partial sectional view of another embodiment.

In regard to production of the porous body, it may be obtained by the so called gravity sintering method which comprises a process wherein graded metal powder, frequently spherical metal powder, is poured by gravity into an appropriately shaped confined space, and usually vibrated to cause it to compact uniformly. As is obvious the choice of particle size of the metal powder will largely determine the amount of porosity, i.e. void space. The metal powder or aggregate so packed is then sintered in accordance with well-known powder metallurgy practices, producing a porous metal body whose bulk density, or apparent density, is but a fraction of the density of the metal or alloy from which the powder particles are obtained. Generally the conditions of vibration and conditions of sintering are chosen to result in an apparent density of approximately 25% to 75% of the solid density of the corresponding alloys. In another procedure for the production of such porous metal bodies the process may comprise blending intimately a graded metal powder with a combustible substance, such as for example wood flour or other organic particulate material, or a soluble material whose melting point exceeds the sintering temperature of the metal powder. After the formulation of this dry blend, the mixture of metal powder and combustible or soluble substance is then compacted under pressure, such as by rolling resulting in a body that has no voids and is reasonably firm, sufficient for handling. This body is then sintered in accordance with well-known powder metallurgy practices to produce a cohesive structure in which the metal particles are sintered together at their respective points of contact and the combustible or soluble material remains unbonded to the metal particles forming discrete islands within the metal body. Upon completion of the sintering operation and if the non-metallic component is combustible, then the resultant body will in fact contain void spaces everywhere previously occupied by the combustible material since the latter will have burned away in the course of sintering. In the case utilizing a soluble material whose melting point is higher than the sintering temperatures of the metal, the soluble material will remain intact after the final stages of sintering and can be subsequently removed by leaching and dissolving with a liquid, resulting in a network of interconnected pores.

In the modification of the foregoing it is noted the above described dry blend of metal powder and combustible or soluble substance may be replaced, respectively, by a paste or slurry obtained by suspending the admixed powder metal and combustible or soluble particles in a suitable liquid vehicle, as for example water or alcohol; or in applications where the combustible substance is mostly organic, by choosing a combustible substance that is a viscous liquid instead of being particulate such as for example a liquid phenolic resin. Alternately the mixture of metal powder and void or pore forming substance and vehicle, or void or pore forming substance alone, may be prepared into a paste which may be brought into the desired shape by pressing or extrusion.

A further method of producing the sintered porous metal bodies comprises melting a metal or alloy and casting it into the interstices of a porous aggregate of a particulate soluble material whose melting point exceeds that of the metal. Upon solidification of the metal, a component is produced which contains the network of the soluble material interspersed within the solid metal which soluble material is thereupon removed by leaching or dissolving, leaving behind it interstices that interconnect and form a porous network within the resultant metal body. Soluble substances contemplated for these purposes, be it for blending with solid metal powder or for the above casting process, comprise sodium chloride in conjunction with aluminum and aluminum alloys, aluminum fluoride in conjunction with copper alloys, and calcium oxide in conjunction with alloys having melting points higher than copper alloys. As will be understood other substances, particularly inorganic salts, are readily available and known to the art for such purpose as for example various phosphates, such as tri-sodium phosphate.

A still further method of producing a porous metal body comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

Preferably the spacer or supporting substances contemplated herein are liquid soluble and have a melting point higher than the sintering temperature of the particulate metal layer, or at least higher than the temperature at which that layer commences to acquire reasonable mechanical strength in the course of sintering. Such soluble substances are for example sodium chloride, which melts at 801° C., a temperature somewhat below the customary sintering temperature of copper; and it may be used in connection with copper aggregate because the latter will acquire adequate strength during sintering before the sodium chloride begins to melt. Other such soluble substances are sodium aluminate (melting at 1650° C.), potassium sulphate (melting at 1076° C.), sodium metasilicate (melting at 1088° C.), aluminum chloride (melting at 1040° C.), and others. The choice of such soluble spacer or supporting substances will of course also depend on possible solid phase reactions with the metal surrounding them, at the temperatures of sintering. For example, while one of the most effective weld-inhibiting materials adapted for use as the spacer or supporting substance in connection with copper and aluminum alloys is graphite or carbon, austenitic stainless steel would be harmed by that spacer substance through carburizing.

In this respect it is pointed out that also contemplated within this invention is the utilization of a specific form of a carbon as a weld-inhibiting material in the fabrication of these composite structures. The particular form of carbon contemplated is that obtained in situ, from organic substances, by pyrolysis. As is known, progressive elevated temperature exposure of a variety of organic substances in inert or reducing atmospheres results in progressive thermal degradation of the organic material and ultimately in pyrolysis similar to coking. The residual carbonaceous matter is strong and cohesive as well as stable, except under oxidizing conditions at elevated temperatures. The resultant weld-inhibiting material, originally introduced as an organic substance may thus maintain reasonable mechanical strength and its functional integrity not only at room temperature but also throughout the process of heating during the sintering operation, while the powder metal acquires appreciable strength and ability to support itself over a preformed channel forming the groove of the desired composite structure. However, the organic material supplied to the solid metal surface or within the preformed channel of a solid metal member, may be used as a weld-inhibiting material only if the carbonaceous residue remaining after the sintering operation is removable. This in turn depends upon the particular metal aggregate applied above it which must be pervious and porous enough to permit the ambient atmosphere to react freely with the contents of the channels. In such a case, the pyrolyzed organic substance will break down further and oxidize without residue, if the sintering furnace atmosphere is adjusted to allow for progressive formation of gaseous carbon compounds, or, as is preferable, if exposed to air while still hot enough to oxidize vigorously.

For example, a paste-like mixture of silica sand and a phenolic varnish of the resol type may be used. The weld-inhibiting materials so formed can be hardened at room temperature and then upon exposure to increasing temperatures, will progressively harden and cure as is naturally expected for a phenolic resin, and thereafter progress through several stages of heat degradation while heated to still higher temperatures in an inert atmosphere. In a specific application in which spherical copper particles were metallurgically bonded to a copper sheet, during the course of the sintering operation the sand particles remained bonded together due to the carbonaceous residue of the phenolic resin. Upon removal of the sintered composite from the furnace and while still at an elevated temperature approaching that of the furnace, but now exposed to ambient air, the carbon oxidizes almost instantaneously leaving the sand free flowing and devoid of any bond.

Oxidation of the pyrolyzed residue may be accomplished usually by mere exposure to an atmosphere containing sufficient oxygen to burn the carbon, but not enough to oxidize the metal harmfully. In the case of copper, sintering may be followed by air exposure at room temperature, as above described; in the case of stainless steels, if brightness is to be preserved, cooling after sintering may take place in a protective atmosphere which may have just enough oxygen to react with the carbon. A wide variety of such weld-inhibiting spacer and supporting substances are readily available and known to the art; and in principle such formulations usually consist of free flowing comparatively inert granular materials, such as silica sand, bonded with phenol formaldehyde, urea-formaldehyde, polystyrene, polyethylene, furfural formaldehyde, coal tar, etc., or such organic materials alone and others, for example, paper, adhesive tape, etc., in the event that only thin films need to be applied prior to sintering.

As will be understood, the selection of materials from which the porous and solid components are made to comprise the structures described herein and in the co-pending application, is based on considerations within the skill of persons acquainted with mechanical, physical and chemical properties of materials. While the structures described herein have been identified as being metallic on numerous occasions, it is pointed out that all or part of these structures may be made of non-metallic materials, as called for by their intended use. Thus, the porous layer may incorporate catalysts, as pointed out in the co-pending application, which catalysts may be non-metallic. The porous layer may also consist in part or entirely of glasses, carbides, nitrides, oxides, or borides, for example in instances calling for heat resistance, corrosion resistance or insulating properties not available in metals and alloys. The porous layer may also consist of synthetic polymeric substances, for similar reasons, as for example sintered porous fluorocarbon resins, silicone resins, and others. The solid component is usually made of metal strip or plate which may be coated with non-metallic materials of the kind referred to. In instances not calling for high strength the solid component may also be made of synthetic resins made into strip, sheet or plate stock.

Several of the embodiments described herein may be made advantageously of non-metallic components. Thus, a component intended to distribute highly corrosive inorganic acid vapors may be made of fluorocarbon resins; another intended to serve as diffuser of combustible gas also acting as a radiant burner may be made in part of silicone carbide. Other examples are obvious to those skilled in the art of constructing components to be used in environments of high temperature and corrosive attack.

It will be understood that the porous layer referred to herein may be produced in still additional ways either in situ, upon the surface of a solid component or separately, to be joined thereto. Thus, the porous component may be produced by mechanical perforation of a solid metallic sheet, however, such a method would generally be expensive and cumbersome. The porous layer may also be produced by spraying of metal by techniques well-known to those skilled in the metal working art and carried out either with a wire gun or a powder gun, whereby, through appropriate and well-known adjustment of the spray gun, the spraying process may be directed so as to produce a porous sprayed deposit. A porous sprayed deposit may also be produced with the powder gun by spraying along with the material intended to form the porous layer and intimately intermingled with it an evanescent solid which will be deposited along with the rest of the sprayed material and which may then be removed from the porous composite by leaching as described in previous examples. However, this procedure of producing the porous layer by spraying is also cumbersome and expensive in most instances, compared to the other means described herein and in the copending applications.

As indicated above, the composite structures of this invention are adapted for many applications and particularly for use as heat exchangers. As is well known, tubular components used in heat exchangers were heretofore usually provided with fins, corrugations and other extensions of their surface so as to present an economic maximum extended surface area for a given weight of heat exchanger structure. However, such heat exchanger structures can be provided with greatly increased heat transfer surfaces by i.e. heat conductive bonding of a solid sheet metal unit to a sheet-like layer of sintered porous metal in accordance with any of the methods described heretofore. As has been discussed the sheet-like porous metal component is attached to the solid sheet metal unit by a metallic bond which will warrant good heat transfer with channels provided between the confronting faces of the components by interrupting the metallurgical bond in predetermined areas and in a predetermined pattern. These channels serve to conduct a fluid between the solid and porous layers with subsequent diffusion of flow through the porous body, thereby contacting the large surface area within the porous body, as defined by the innumerable interstices extending between the integrated particles of the porous body. For example for application in refrigerator systems, where the solid sheet metal unit is internally laminated with its laminations distended into a system of fluid passageways, the fluid contained within the solid metal component may be water and the fluid contained within the channels may be liquid refrigerant or refrigerant vapor, as would be the case when such composite structures are used as refrigeration condensers or evaporators.

FIGURES 1 and 2 illustrate an embodiment in accordance with this invention. In one modification of this embodiment a conventional sealed motor compressor 120 is provided which receives through conduit 121 refrigerant vapor discharged from a conventional evaporator 122 with the compressor discharging compressed refrigerant gas through conduit 222 into a condenser element 123. The condenser element comprises cover members 124 and 125 suitably secured together in any appropriate manner as by bolts 129. The cover members 124 and 125 define condenser chambers 126 and 127 having mounted therein a heat exchange assembly 128 comprised of a sheet-like porous body 130 having metallurgically bonded to its opposite faces the flat surface of an internally laminated sheet metal unit 131 whose laminations are inflated to contain an internal system of passageways defined by bulges 132 extending out of only one of the external faces of the sheet metal unit 131. Cooling water is introduced and discharged by inlet and outlet conduits 133 and 134, respectively, mounted in suitable openings provided in the passageways defining bulges 132. Inlet and outlet conduits 133 and 134 are operatively connected to pump 300. Intercommunication is provided between chambers 126 and 127 by means of fluid transfer openings 135 pierced through the units 131. On passage from chambers 126 to 127 the compressed refrigerant condenses and is discharged through conduit 136 into the inlet of the evaporator 122. Thus, the function of the porous body is as follows, upon passage of the refrigerant through the porous body, free flow and distribution of the refrigerant is permitted in heat exchange relationship to the juxtaposed cooling member while the refrigerant is passing through the porous body. For maximum heat transfer, a heat exchanger application used in accordance with the embodiments of this invention may comprise a porous composite structure such as illustrated in FIGURE 3 and comprised of a sheet-like sintered porous metal body 137 bonded to a sheet metal unit 138 suitably embossed to adapt it for the formation of fluid channels. In the embodiment illustrated the fluid channels may be considered to be formed of width A separated by solid portions of the sheet metal unit of width B with the porous body having a thickness C. For purposes of explanation a preferred embodiment of such a structure will be discussed in applications utilizing a first fluid in contact with the solid sheet metal component on its side away from the porous overlay, and another fluid in contact with the sintered porous body both on its external surface, on its internal surface defined by the pore space contained therein, and within the fluid channels 139 between sheet metal unit 138 and the porous component 137. As can be readily seen heat exchange is effected because the first fluid will heat (or cool) the solid sheet metal unit 138 which in turn will transmit heat into the sintered porous metal body 137. This sintered porous body in turn has an extended specific surface characteristic of porous bodies and in contact with that surface the second fluid progressing from the fluid channels 139 outward or from the external surface of the porous body inward into channels 139 will be rapidly caused to acquire heat transmitted from the first fluid. As is well known, heat conductivity of a porous body diminishes as the pore area diminishes and therewith the active heat transfer surface increases. Thus, the greater the gain in this structure on account of increased surface, the greater also the loss of heat conductivity. Moreover, heat transfer into the fluid circulating through the porous overlay is also influenced by the rate of flow which in turn depends on the pressure drop characteristic of fluid flow through the porous body. It was found that the heat tarnsfer structure illustrated in FIGURE 3 comprises a most effective heat exchanger if thickness C of the porous body is approximately one-half of the width B between the fluid channels 139 and if the width of channels 139 is approximately the same as the width of the spacing B between the channels. Although a simple embodiment has been illustrated, it is to be understood that it is readily possible to construct a structure with a very complex network of fluid channels 139 as has been previously described above, however, bearing in mind that in any small local region of such a channel network, the above-mentioned realtionship may be readily applied for best heat transfer into the porous body and for the equalization of flow through the porous body in all directions.

Although the invention has been described with reference to specific embodiments, materials and details, various modifications and changes, within the scope of this invention, will be apparent to one skilled in the art and are contemplated to be embraced within the invention.

What is claimed is:

1. A heat exchanger comprising a sheet-like porous body metallurgically bonded to an imperforate sheet metal member substantially throughout the extent of said body, a first fluid circulating throughout said body, a first fluid circulating means inducing flow of said first fluid throughout said body, conduit means defined by a portion of said member juxtaposed said body, a second fluid circulating through said conduit means in heat exchange relationship with said first fluid substantially throughout said sheet-like porous body, with said member forming an imperforate separation between said first and said second fluids, means associated with at least one sheet to cause said first and second fluids to be in heat exchange relationship throughout the extent of said body, and a second fluid circulating means operatively connected to said conduit means to induce flow of said second fluid through said conduit means.

2. A heat exchanger according to claim 1 wherein said member contains at least one tubular passageway.

3. A heat exchanger comprising a sheet-like substantially planar prous body metallurgically bonded to an imperforate substantially planar sheet metal member, a first conduit means defined by a portion of said body and a portion of said member, a first fluid circulating throughout said first conduit and said body, a first fluid circulating means inducing flow of said first fluid throughout said first conduit and said body, second conduit means defined by a portion of said member juxtaposed said body, a second fluid circulating through said conduit means in heat exchange relationship with said first fluid substantially throughout said sheet-like porous body, with said member forming an imperforate separation between said first and second fluids, means associated with at least one sheet to cause said first and second fluids to be in heat exchange relationship throughout the extent of said body, and a second fluid circulating means operatively connected to said second conduit means to induce a flow of said second fluid through said second conduit means.

4. A heat exchanger comprising a sheet-like substantially planar porous body metallurgically bonded to an imperforate substantially planar sheet metal member, a first fluid circulating throughout said body, a first fluid circulating means inducing flow of said first fluid throughout said body, conduit means comprising embossments, said conduit means defined by a portion of said member juxtaposed said body, a second fluid circulating through said conduits in heat exchange relationship with said first fluid substantially throughout said sheet-like porous body, with said member forming an imperforate separation between said first and second fluids, means associated with at least one sheet to cause said first and sceond fluids to be in heat exchange relationship throughout the extent of said body, and a second fluid circulating means operatively connected to said conduit means to induce flow of said second fluid through said conduit means.

5. The structure of claim 4 wherein said member comprises a metal sheet, and said conduits comprise embossments in said sheet forming groove-like indentations protruding out of a face of said member away from said body.

6. The structure of claim 4 wherein said conduit means comprises laminations contained internally within said member and spaced apart to define a system of fluid passageways.

7. The structure of claim 4 including an evaporator operatively connected to said first fluid circulating means to discharge refrigerant vapor to said first fluid circulating means.

8. A heat exchanger comprising a plate-like substantially planar porous body metallurgically bonded to an imperforate, substantially planar plate-like sheet metal member, a first fluid circulating throughout said body, a first fluid circualting means inducing flow of said first fluid throughout said body, conduit means juxtaposed said body, said conduit means compirsing embossments in said sheet forming groove-like indentations protruding out of a face of said member away from said body, said conduit means defined by a portion of said member, a second fluid circulating through said conduit means in heat exchange relationship with said first fluid substantially throughout said sheet-like porous body, with said member forming an imperforate separation between said first and second fluids, means associated with at least one sheet to cause said first and second fluids to be in heat exchange relationship throughout the extent of said body, and a second fluid circulating means operatively connected to said conduit means to induce flow of said second fluid through said conduit means.

References Cited by the Examiner

UNITED STATES PATENTS

| | | | |
|---|---|---|---|
| 2,021,995 | 11/1935 | Heath. | |
| 2,361,854 | 10/1944 | McCormack | 62—505 |
| 2,401,797 | 6/1946 | Rasmussen. | |
| 2,509,376 | 5/1950 | Trask | 230—127 |
| 2,695,230 | 11/1954 | Haller | 75—211 X |
| 2,807,437 | 9/1957 | Roush | 253—77 |
| 2,836,884 | 6/1958 | Graham | 29—156.8 X |
| 2,941,759 | 6/1960 | Rice et al. | 165—180 X |
| 2,946,681 | 7/1960 | Probst et al. | 253—77 X |
| 3,135,044 | 6/1964 | Mote et al. | 29—423 X |
| 3,138,009 | 6/1964 | McCreight | 62—315 |

FOREIGN PATENTS 731,161  6/1955  Great Britain.

OTHER REFERENCES

Polonsky et al.: Lightweight Cellular Metal Transactions of American Foundryman's Society, vol. 69 (1961), pp. 65–79, 75–20. (Foam Digest.)

Campbell, J. B.: "Porous Metal Sheet, Materials and Methods," April 1955.

ROBERT A. O'LEARY, *Primary Examiner*.

CHARLES SUKALO, FREDERICK L. MATTESON, JR., *Examiners*.

T. W. STREULE, JR., *Assistant Examiner*.